US009828265B2

(12) United States Patent
Blanco Tirado et al.

(10) Patent No.: US 9,828,265 B2
(45) Date of Patent: Nov. 28, 2017

(54) MATERIAL USED IN THE REMOVAL OF CONTAMINANTS FROM LIQUID MATRICES

(71) Applicant: UNIVERSIDAD INDUSTRIAL DE SANTANDER, Bucaramanga (CO)

(72) Inventors: Cristian Blanco Tirado, Bucaramanga (CO); Marianny Yajaira Combariza Montañez, Bucaramanga (CO); Martha Liliana Chacón Patiño, Bucaramanga (CO)

(73) Assignee: Universidad Industrial de Santander, Bucaramanga (CO)

( * ) Notice: Subject to any disclaimer, the term of this patent is extended or adjusted under 35 U.S.C. 154(b) by 83 days.

(21) Appl. No.: 14/424,532

(22) PCT Filed: Aug. 28, 2013

(86) PCT No.: PCT/IB2013/058081
§ 371 (c)(1),
(2) Date: Jun. 17, 2015

(87) PCT Pub. No.: WO2014/033642
PCT Pub. Date: Mar. 6, 2014

(65) Prior Publication Data
US 2015/0315048 A1    Nov. 5, 2015

(30) Foreign Application Priority Data

Aug. 28, 2012 (CO) .................................. 12146361

(51) Int. Cl.
*C02F 1/72* (2006.01)
*C02F 1/28* (2006.01)
(Continued)

(52) U.S. Cl.
CPC ............... *C02F 1/725* (2013.01); *B01J 23/34* (2013.01); *B01J 35/0006* (2013.01); *B01J 35/06* (2013.01);
(Continued)

(58) Field of Classification Search
CPC .............. B01D 2239/0442; B01J 23/34; B01J 35/0006; B01J 35/06; B05D 1/18;
(Continued)

(56) References Cited

U.S. PATENT DOCUMENTS 5,205,835 A * 4/1993 Tieckelmann ............ D06L 3/02
8/101
2004/0266641 A1* 12/2004 Gentschev ............... A61K 8/19
510/312
(Continued)

OTHER PUBLICATIONS

"What is ultrasonic sound?", Reference.com, (obtained Dec. 2016).*

(Continued)

*Primary Examiner* — Lucas Stelling
(74) *Attorney, Agent, or Firm* — The Morales Law Firm, LLC; Joseph L. Morales

(57) ABSTRACT

The invention relates to a material consisting of hard fibers on which nanoparticles of metals or metal oxides, preferably period IV transition metal oxides, are deposited, using different techniques, said material being used in the degradation and removal of contaminants found in liquid matrices. The invention also relates to a method for the in situ synthesis thereof.

17 Claims, 8 Drawing Sheets

Figure 1:
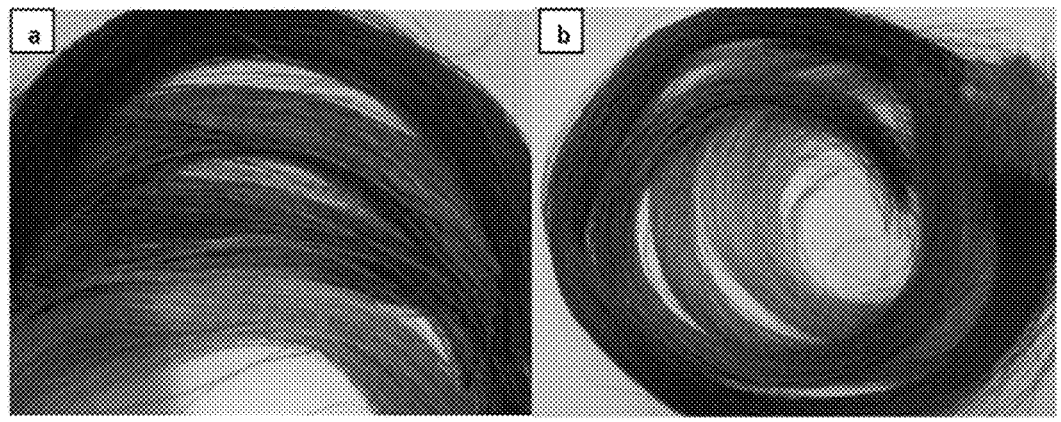

(51) Int. Cl.

| | |
|---|---|
| *B01J 35/06* | (2006.01) |
| *B01J 37/06* | (2006.01) |
| *B01J 37/34* | (2006.01) |
| *B82Y 30/00* | (2011.01) |
| *B82Y 40/00* | (2011.01) |
| *C08K 3/22* | (2006.01) |
| *C08L 97/02* | (2006.01) |
| *B01J 23/34* | (2006.01) |
| *B01J 35/00* | (2006.01) |
| *B05D 1/18* | (2006.01) |
| *C01G 45/02* | (2006.01) |
| *C01G 1/02* | (2006.01) |
| *C02F 103/30* | (2006.01) |
| *C02F 103/14* | (2006.01) |
| *C02F 101/20* | (2006.01) |
| *C02F 101/30* | (2006.01) |
| *C02F 101/34* | (2006.01) |

(52) U.S. Cl.
CPC .............. *B01J 37/06* (2013.01); *B01J 37/343* (2013.01); *B05D 1/18* (2013.01); *C01G 1/02* (2013.01); *C01G 45/02* (2013.01); *C02F 1/281* (2013.01); *C08K 3/22* (2013.01); *C08L 97/02* (2013.01); *B01D 2239/0442* (2013.01); *B82Y 30/00* (2013.01); *B82Y 40/00* (2013.01); *C01P 2002/82* (2013.01); *C01P 2002/85* (2013.01); *C01P 2004/03* (2013.01); *C01P 2004/64* (2013.01); *C01P 2006/40* (2013.01); *C02F 2101/20* (2013.01); *C02F 2101/308* (2013.01); *C02F 2101/345* (2013.01); *C02F 2103/14* (2013.01); *C02F 2103/30* (2013.01); *C02F 2305/02* (2013.01); *C08K 2003/2262* (2013.01); *C08K 2201/011* (2013.01); *C08L 2205/16* (2013.01)

(58) Field of Classification Search
CPC .......... B82Y 30/00; B82Y 40/00; C01G 1/02; C01G 45/02; C01P 2002/82; C01P 2002/85; C01P 2004/03; C01P 2004/64; C01P 2006/40; C02F 1/281; C02F 1/725; C02F 2101/20; C02F 2101/308; C02F 2101/345; C02F 2103/14; C02F 2103/30; C02F 2305/02; C08K 3/22; C08K 2003/2262; C08K 2201/011; C08L 97/02; C08L 2205/16

See application file for complete search history.

(56) References Cited

U.S. PATENT DOCUMENTS

| | | | | |
|---|---|---|---|---|
| 2008/0264259 | A1* | 10/2008 | Leung | ................ B01D 39/1623 96/143 |
| 2009/0098033 | A1* | 4/2009 | Lian | ..................... B22F 1/0085 423/213.5 |
| 2011/0111948 | A1* | 5/2011 | Kim | ........................ B01J 23/28 502/5 |

OTHER PUBLICATIONS

"Manganese Oxide," NIOSH, Center for Disease Control and Prevention, 2001.*
Chacon-Patino et al. "Biocomposite of nanostructured $MnO_2$ and fique fibers for efficient dye degradation," Green Chem. 15, 2920-2928, Aug. 19, 2013.*
A. Bhatnagar et al., Removal of Congo Red Dye from Water Using Carbon Slurry Waste, Environ. Chem. Let. (2005) p. 199-202, vol. 2.
Al-Nakib Chowdhury et al., Oxidative and antibacterial activity of $Mn_3O_4$, J. Haz. Mat. (2009), 1229-1235, vol. 172.
C. Yang et al., Electrochemical Coagulation for Textile Effluent Decolorization, J. Haz. Mat., (2005), p. 40-47, vol. 127.
Chandra et al., $Mn_2O_3$ decorated graphene nanosheet: An advanced material for the photocatalytic degradation of organic dyes, Materials Science and Engineering 177:855-861 (2012).
Chia-Hung Kuo and Chang-Kang Lee, Enhancement of enzymatic saccharification of cellulose by cellulose dissolution pretreatments, Carbohydrate Polymers 77:41-46 (2009).
Colombian Office Action dated Dec. 22, 2015.
Contreras et al., Fractografía De La Fibra Natural Extraida Del Fique Y De Un Material Compuesto Reforzado Con Tejido De Fibra De Fique Y Matriz Resina Poliester, Suplemento de la Revista Lationamericana de Metalurgia y Materiales (1):57-67 (2009).
Gong, et al., Polymer-Assisted Synthesis of Manganese Dioxide/Carbon Nanotube Nanocomposite with Excellent Electrocatalytic Activity toward Reduction of Oxygen, J. Phys. Chem. 111:1882-1887 (2007).
Halvorsen et al, Stabilization and Characterization of Pt Nanoparticles on HOPG, ECS Transactions 11 (31): 75-86 (2008).
Hinestroza, Juan P. and Dong, Hong, Metal Nanoparticles on Natural Cellulose Fibers: Electrostatic Assembly and in Situ Synthesis, ACS Applied Materials & Interfaces 1(4):797-803 (2009).
Huren, A et al., Biological Treatment of Dye Wastewaters Using an Anaerobic-Oxic System, Chemosphere 33(12):2533-2542 (1996).
I. Arslan et al., Advanced Chemical Oxidation of Reactive Dyes in Simulated Dyehouse Effluents by Ferrioxalate-Fenton/UV-A and $TiO_2$/UV-A Processes, Dyes and Pigments, (2000), p. 207-218, vol. 47.
Liang et al, Effect of Phase Structure of $MnO_2$ Nanorod Catalyst on the Activity for CO Oxidation, J. Phys. Chem. 112:5307-5315 (2008).
M. Muruganandham et al., Photochemical Oxidation of Reactive Azo Dye with UV-$H_2O_2$ Process, Dyes and Pigments, (2004) p. 269-275 vol. 62.
Menard, Robert et al., Modification of the Electrostatic Environment is Tolerated in the Oxyani34:on Hole of the Cysteine Protease Papain, Biochem. 34: 464-471 (1995).
Nesbitt, H.W. and Banerjee, D, Interpretation of XPS Mn(2p) spectra of Mn oxyhydroxides and constraints on the mechanism of $MnO_2$ precipitation, American Mineralogist, 83:305-315 (1998).
P. Ganan and I. Mondragon, Surface Modification of Fique Fibers. Effects on Their Physico-Mechanical Properties , Polymer Composites, 23(3):383-394.
Polzer et al., Oxidation of an organic dye catalyzed by $MnO_x$ nanoparticles, J. of Catalysis 289:80-87 (2012).
Radhakishnan, et al., Electron Transfer Effects in Ozone Decomposition on Supported Manganese Oxide, J. Phys. Chem. 105:4245-4253 (2001).
Robinson, et al., Remediation of dyes in textile euent: a critical review on current treatment technologies with a proposed alternative, Bioresource Technology 77:274-255 (2001).
S. Link and M. El-Sayed, Size and Temperature Dependence of the Plasmon Absorption of Colloidal Gold Nanoparticles J. Phys. Chem. 103:4212-4217 (1999).
S.Sen et al., Anaerobic Treatment of Real Textile Wastewater with a Fluidized bed Reactor, Water Research (2003) p. 1868-1878, vol. 37.
Shihabudheen, et al., A novel cellulose-manganese oxide hybrid material by in situ soft chemical synthesis and its application for the removal of Pb(II) from water, J. Haz. Mat. 128:986-995 (2010).
Sriskandakumar, T et al., Green Decomposition of Organic Dyes Using Octahedral Molecular Sieve Manganese Oxide Catalysts, J. Phys. Chem. 113:1523-1530 (2009).
Wang et al., Fluorescent Nanoparticles for Multiplexed Bacteria Monitoring, Bioconjugate Chem. 18:297-301 (2007).
Wang, et al., $MnO_2$ Nanorod Supported Gold Nanoparticles with Enhanced Activity for Solvent-free Aerobic Alcohol Oxidation, J. Phys. Chem. 112:6981-6987 (2008).
Wang, et al., Synthesis of $MnO_2$ Microfiber with Secondary Nanostructure by Cotton Template, J. Nanotechnolocy, vol. 2010, Article ID 479172 (Jan. 10, 2010).

(56) References Cited

OTHER PUBLICATIONS

Zhang, et al., Role of Particle Size in Nanocrystalline TiO2-Based Photocatalysts, J. Phys. Chem. 102:10871-10878 (1998).

* cited by examiner

MATERIAL USED IN THE REMOVAL OF CONTAMINANTS FROM LIQUID MATRICES

1. FIELD OF THE INVENTION

The present invention relates to a material useful in treating different liquid matrices for removal recalcitrant contaminants. The field of art to which this invention stands is that dedicated to the treatment and cleaning of waters containing the major pollutants present in nature and environment.

2. BACKGROUND

Dyes from textile industries are one of the majors water pollutants source. These substances reduce the uptake of light, interfering with aquatic plants photosynthesis hence having a direct impact in the oxygen content of water sources, progressive eutrophication and bioaccumulation of these substances (Al-Nakib. C., et al. 2009). Everyday textile industries dispose large quantities of dye-contaminated waters into the rivers (Sen S., et al, 2003). It is estimated that among between 40 to 50% of the initial dye concentration ends up in wastewaters (Bhatnagar, A., et al. 2005). Therefore, it is necessary to innovate in order to obtain new alternatives for dyes contaminated waters treatment.

There are several technologies to treat wastewaters contaminated with dyes. Being relevant the $H_2O_2$ oxidation activated with UV light (Muruganandham, M., et al. 2004), advanced oxidative processes using Fenton reactant (Arslan, D., et al. 2000), electrochemical flocculation (Yang, C., et al. 2005), sorption by cucurbiturils (cyclic polymer formed from glycoluryl and formaldehyde) (Robinson, T., et al. 2001) and biological treatments (using either bacteria or fungi) (An, H., et al. 1996). These technologies used to remove wastewaters color are expensive and can produce secondary pollutants, by transferring those contaminants from liquid to solid phase (Burtscher, E., et al. 2004). Therefore, it is necessary to contribute developing new, non-expensive and secondary pollutant-free technologies for removal of color from wastewaters for short or long term.

Recently, nanostructured manganese oxides have drawn attention because of promising applications that these materials could have in several industrial processes. For instance, as main components in battery systems and as catalyst for a wide range of industrial processes. $MnO_2$ is the most important of manganese oxides, having more than 14 polymorphs and being widely used given that its internal structure has cavities or pockets with similar sizes to alkaline and alkaline earth cations, and heavy metals cations Therefore, $MnO_2$ is a promissory material for potential applications as molecular sieve and water softening systems (Stobbe, E., et al. 1999).

There are several abstracts and disclosures describing $MnO_2$ nanoparticles synthesis and characterization in solution. The most common procedure involves a reduction of Mn(VII) salts with a suitable reducing agent (Stobhe, E., et al. 1999). Sonochemical aqueous reduction of Mn(VII) in presence of surfactants have also been used to synthesize $MnO_2$ nanoparticles in solution. Disclosures show that nanoparticles of $MnO_2$ obtained using ultrasound are more homogeneous in size and shape. In addition, it has been reported that a longer exposure to ultrasound leads the reduction from Mn(IV) to $Mn^{2+}$ (Stobbe, E., et al. 1999).

The interesting properties observed in nanoparticles in solution indicate that these materials may have more versatility in applications if synthesized in solid phase immobilized on a holder. Thus the processes of nanoparticles "protection" with monolayers of organic molecules that might prevent the use of the material surface are avoided. Synthesis methods contemplating, one step synthesis of manganese dioxide nanocrystals inside the channels of mesoporous silica (SBA-15) using manganese nitrate as precursor. $MnO_2$ nanocrystals forming in SBA-15 was performed by microwave digestion, achieving that 40% of the mesoporous support volume to be occupied with the metal oxide (Zhu, S., et al. 2006).

In 2004, it was developed an effective technique named "two solvents method" which allowed complete filling of the pores of SBA-15. The first step of the synthesis was to incorporate inorganic precursors into the SBA-15 channels through two kinds of solvents, which facilitate the transfer of the precursor ion from the reaction mixture to the surface of the mesoporous silica channels. The next step was to connect the precursors into the pores by means of thermal treatment, which induced transformation into oxide nanoparticles. The disadvantage of this method was presented by the inability to control the synthesized oxide morphology (Zhu, S., et al. 2006).

In parallel, sonochemical methods have been used to generate novel materials in short reaction times. It has been reported that nanocrystalline materials of oxides obtained by sonochemical methodologies exhibit high purity compared to the materials obtained by conventional methods (Zhu, S., et al. 2006). The chemical effect of ultrasound is due to acoustic cavitation phenomenon, which causes the formation, growth and collapse of bubbles in a liquid, giving particular properties to solutions irradiated with ultrasound waves. Acoustic cavitation produces water and other aqueous solutions reactive radicals. These reactive radicals which have temperature, pressure and extremely high cooling rate, can reduce metal ions to metal or metal oxides nanoparticles (Zhu, S., et al. 2006).

In 2006, Shenmin Zhu et al (Zhu, S., et al. 2006), reported the synthesis of mesoporous $MnO_2$ using SBA-15 as a silica matrix and $KMnO_4$ in an aqueous HCl solution as precursor, in the presence of ultrasonic waves for 6 hours. The analysis of X-ray diffraction revealed that the $MnO_2$ reaction product was amorphous with a small amount of nanocrystalline phase. Additionally, electron microscopy analysis confirmed the homogenous synthesis of nanostructures.

As shown, the mesoporous silica and the surfactant substances have been widely used in the preparation of nanostructured oxides. In recent years there has been increased interest in using biological supports because of their interesting structures, which can be useful in the synthesis of nanoparticles. Compared to other media, biological materials are "ecofriendly" and easy to obtain. The structure of biological materials provides stable and controllable conditions in the assembly of nanostructured oxides, which can replicate the template morphology and even its functionalities (Wang H., et al. 2010).

In 2009, Huan-qin Wang and colleagues (Wang, H., et al., 2010) reported the synthesis of $MnO_2$ microfibers with a secondary nanostructure using cotton as support and $KMnO_4$ as precursor. Cotton was treated with aqueous solutions of HCl and NaOH in order to improve its porous structure and create the appropriate ionic environment for $MnO_4^-$ ions insertion in the fiber. A small amount of cotton treated was dispersed in an aqueous solution of $KMnO_4$, and irradiated subsequently with ultrasonic waves for 6 hours. Finally, the sample was dried and calcined at 500° C. By the treatment described above, $MnO_2$ microfibers were obtained, on which $MnO_2$ nanorods and nanoparticles grew up whereas $KMnO_4$ concentration increased during the synthesis.

Manganese oxides are very strong oxidative agents. It have been reported that oxides and hydroxides of $Mn^{3+}$ and $Mn^{4+}$ can oxidize inorganic contaminants such as Cr(III) and Co(II) complexes as well as organic contaminants like substituted phenols, aromatic amines, explosives and pesticides. In 2009, Al-Nakib. C. Chowdhury et al. (Al-Nakib. C., et al. 2009) tested the catalytic activity of $Mn_3O_4$ NPs towards the oxidative degradation of dyes in water.

In 2010, Cao et al Guangsheng (Cao, G., et al. 2010) reported a hydrothermal method of $MnO_2$ α-β nanorods synthesis evaluating its catalytic efficiency in the oxidation of Rhodamine B (RB) and MB. Catalytic oxidation of the dyes was carried out by mixing $H_2O_2$ solutions with a certain amount of $MnO_2$ nanorods (Phases $MnO_2$-α and $MnO_2$-β separately). UV-Vis Spectra of the reaction mixtures showed that $H_2O_2$ does not discolor solutions by itself. The use of a catalyst alone allowed a discoloration degree of 8% in 20 minutes. The combination of the catalyst and $H_2O_2$ allowed a 95% RB solution bleaching in 90 minutes. In the case of the MB solution, greater discoloring was achieved when $MnO_2$-β nanorods were used compared when $MnO_2$-α nanorods were used. The calculation of the surface areas of the catalysts revealed that the $MnO_2$-β phase has a greater surface area and therefore more exposed catalyst sites compared to the $MnO_2$-α phase.

2. SUMMARY OF THE INVENTION

The invention is a new material (that can be used as a catalytic filter) made of hard fibers. Said degradation occurs by the direct contact of the material and the contaminated matrix, having a removing efficiency of 98% for 5 minutes of contact. The invention also includes a methods of synthesizing the material in situ, comprising the steps of: a) Modifying the electrostatic environment of hard fiber; b) Submerging the hard fiber in a metal or metal oxide precursor solution; c) Depositing metals or metal oxides particles into the fiber surface; and d) Optionally, cleansing the resulting material.

The resulting material from the present invention is biodegradable, with high mechanical resistance and reusable. Additionally, it can be synthesized using biodegradable elements available on market. Degradation process is carried out in a heterogeneous phase, combining the high catalytic ability of the nanoparticulated material with the rigid and highly porous structure of the cellulosic polymer

4. BRIEF DESCRIPTION OF THE DRAWINGS

FIG. 1. Modified Fique Fibers with nanostructured $MnO_2$, a) Bionanocomposites produced by sonochemical synthesis, b) Bionanocomposites produced by ethanolic synthesis. From darkest to cleaner color: $[KMnO_4]$=2, 5, 10, 100 mM.

Figure 2:
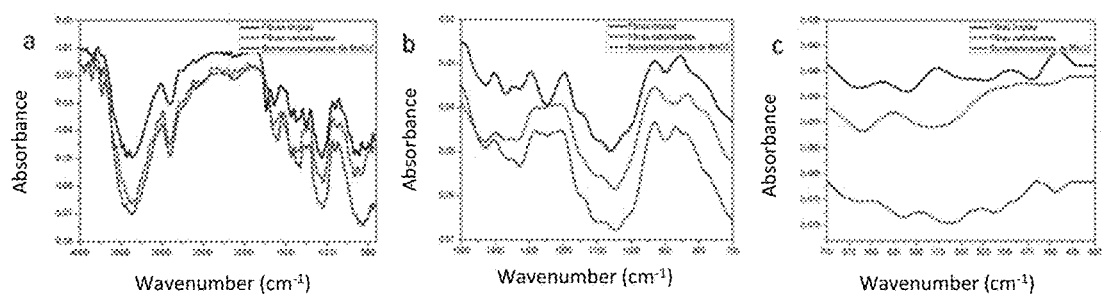

FIG. 2. a. Infrared spectrum from 4000-400 $cm^{-1}$ of raw fique fibers, cationized fique fibers and $MnO_2$ bionanocomposites synthesized with ultrasound; b) Infrared spectrum from 1500-700 $cm^{-1}$ of raw fique fibers, cationized fique fibers and $MnO_2$ bionanocomposites synthesized with ultrasound and c) from 700-400 $cm^{-1}$.

Figure 3:
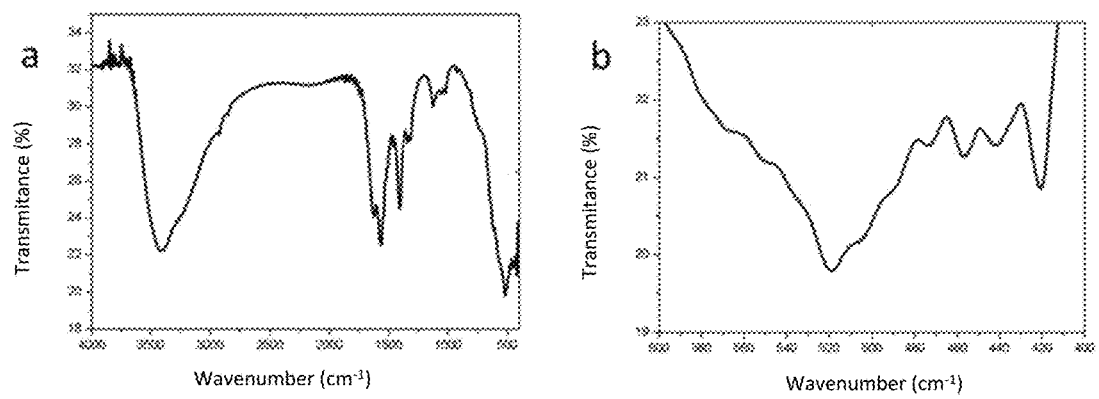

FIG. 3 Infrared spectrum of $MnO_2$ synthesized with ultrasound a) Complete spectrum; b) Infrared spectrum comprised from 600 to 400 $cm^{-1}$.

Figure 4:
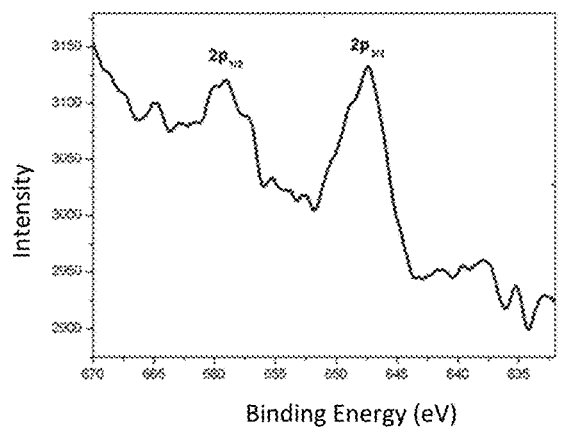

FIG. 4. XPS spectrum of new $MnO_2$ bionanocomposites synthesized with ultrasound.

Figure 5:
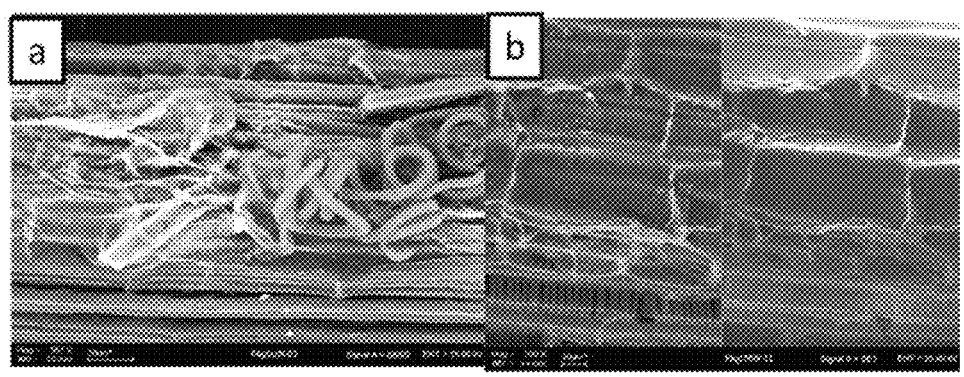

FIG. 5. Raw fique fibers FESEM images.

Figure 6:
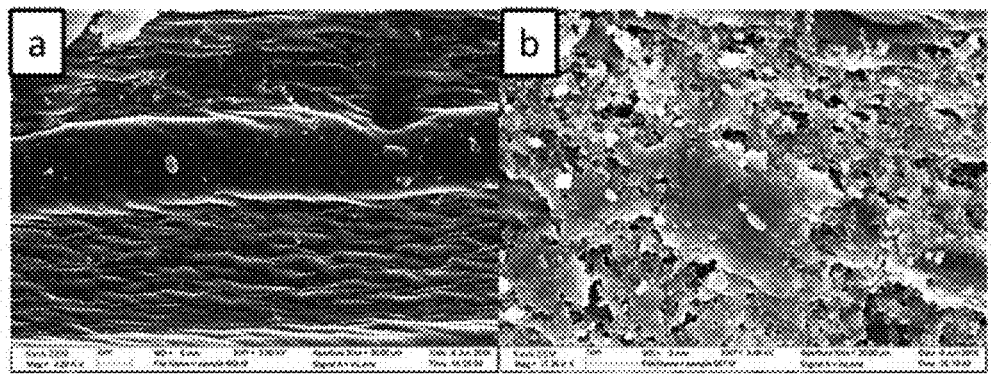

FIG. 6. a) FESEM image of new $MnO_2$ bionanocomposites (precursor concentration 5 mM); b) FESEM image of the new $MnO_2$ bionanocomposites (precursor concentration 50 mM). Both materials were synthesized with ultrasound.

Figure 7:
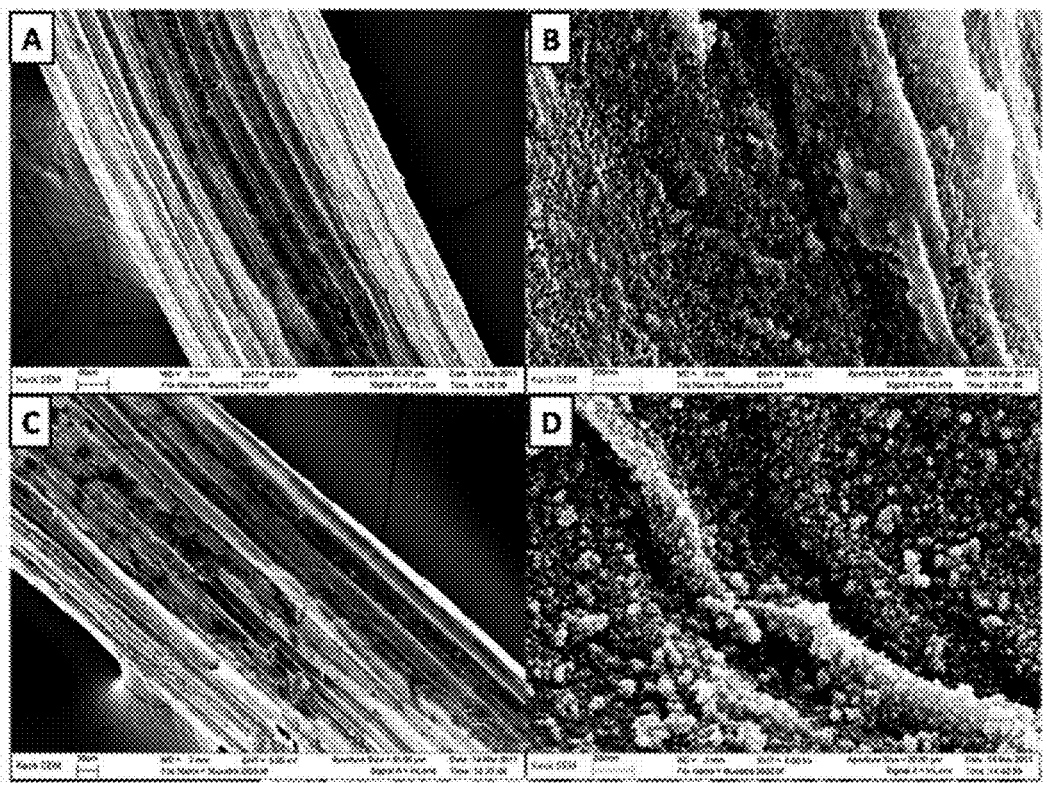

FIG. 7. FESEM images of: A) Fique fiber with modified with $MnO_2$ nanoparticles synthesized with ultrasound; B) Zoom of image A; C) Fique fiber modified with $MnO_2$ nanoparticles synthesized in ethanol; D. Zoom of image C.

Figure 8:
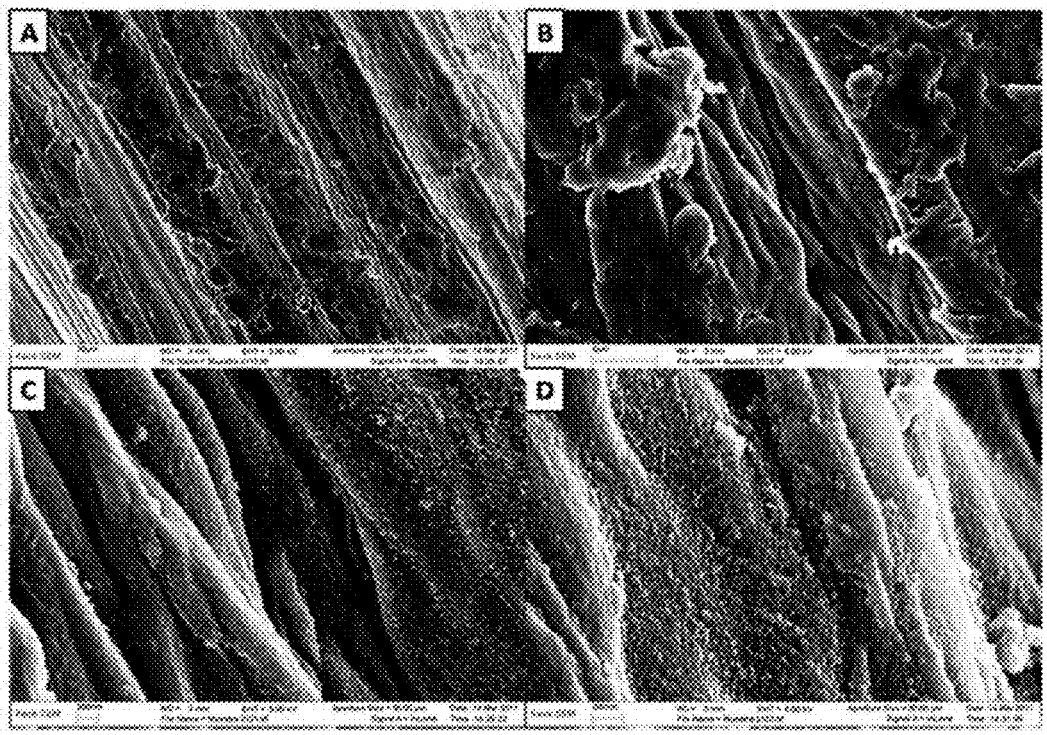

FIG. 8. FESEM images of $MnO_2$ bionanocomposites synthesized with ultrasound. A, B, C y D correspond to zooming images of the same fique fiber section.

Figure 9:
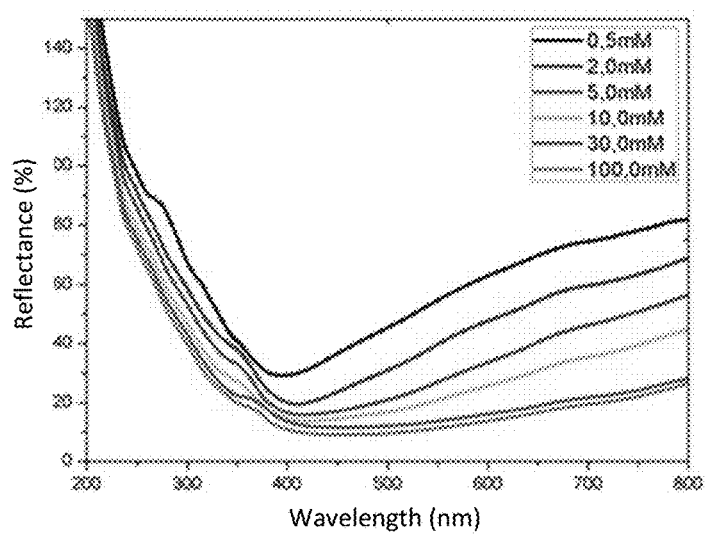

FIG. 9. UV-Vis diffuse reflectance spectra of $MnO_2$ biocomposite synthesized with ultrasound. Precursor concentration is specified. Reference sample was raw fique fibers.

Figure 10:
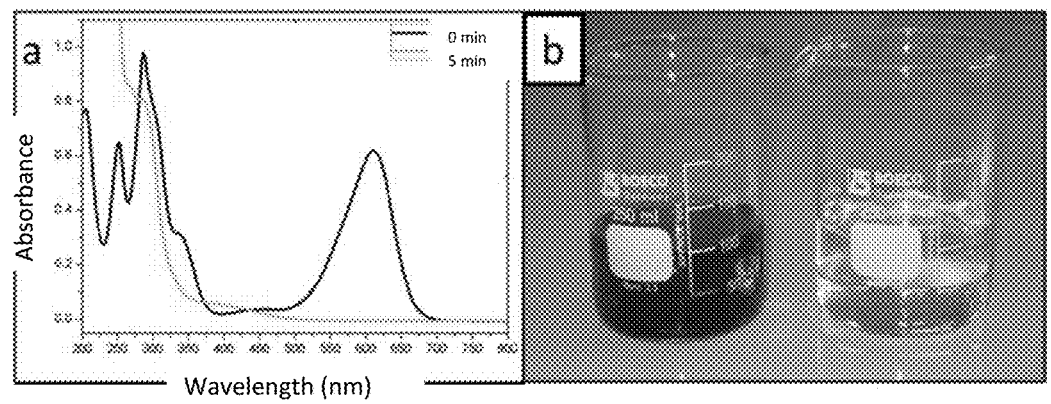

FIG. 10. a) Indigo carmine degradation reaction at pH=2.5 followed by UV-Vis spectroscopy. $MnO_2$ bionanocomposites were synthesized with ultrasound; b) Visual progress of bleaching assay.

Figure 11:
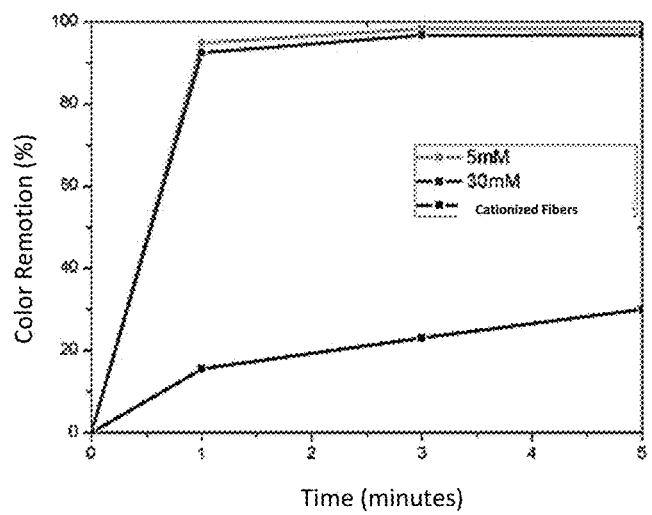

FIG. 11. Dye remotion percentage from indigo carmine solutions as a function of amount and size of $MnO_2$ bionanocomposites nanoparticles synthesized with ultrasound.

Figure 12:
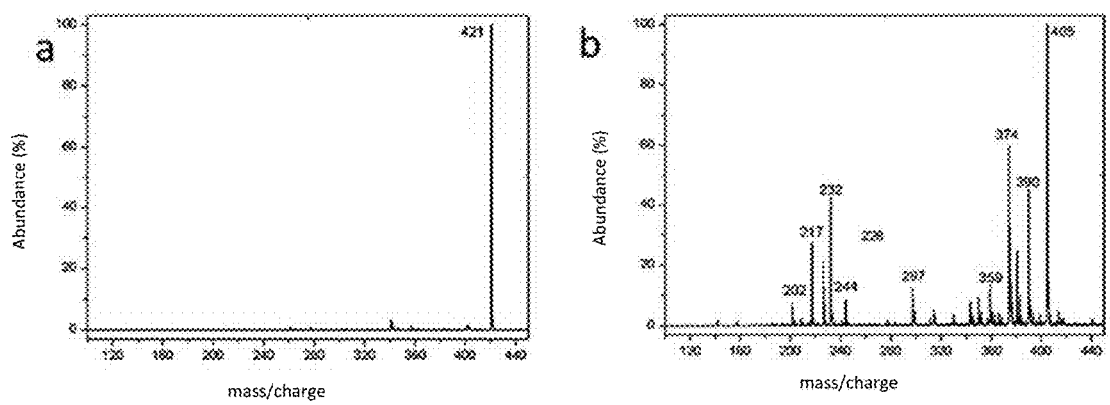

FIG. 12. a) ESI-MS spectrum of original indigo carmine solution. b) ESI-MS spectrum of indigo carmine degradation by of $MnO_2$ bionanocomposites synthesized with ultrasound.

Figure 13:
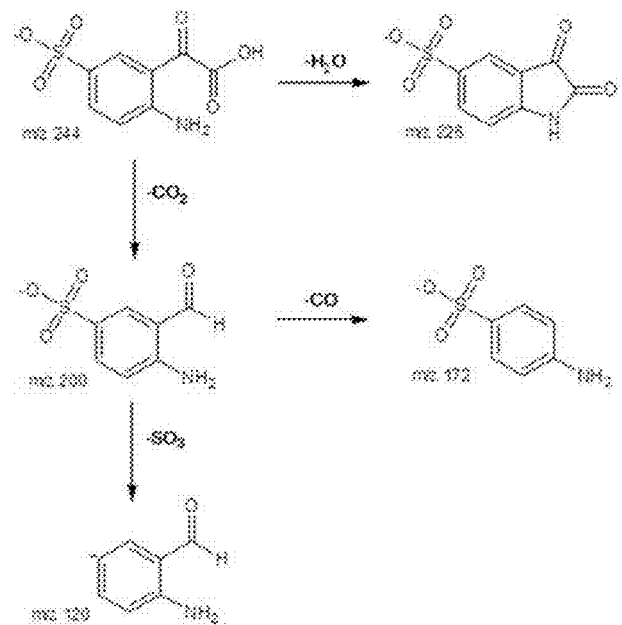

FIG. 13. Fragmentation scheme of ion m/z 244.

Figure 14:
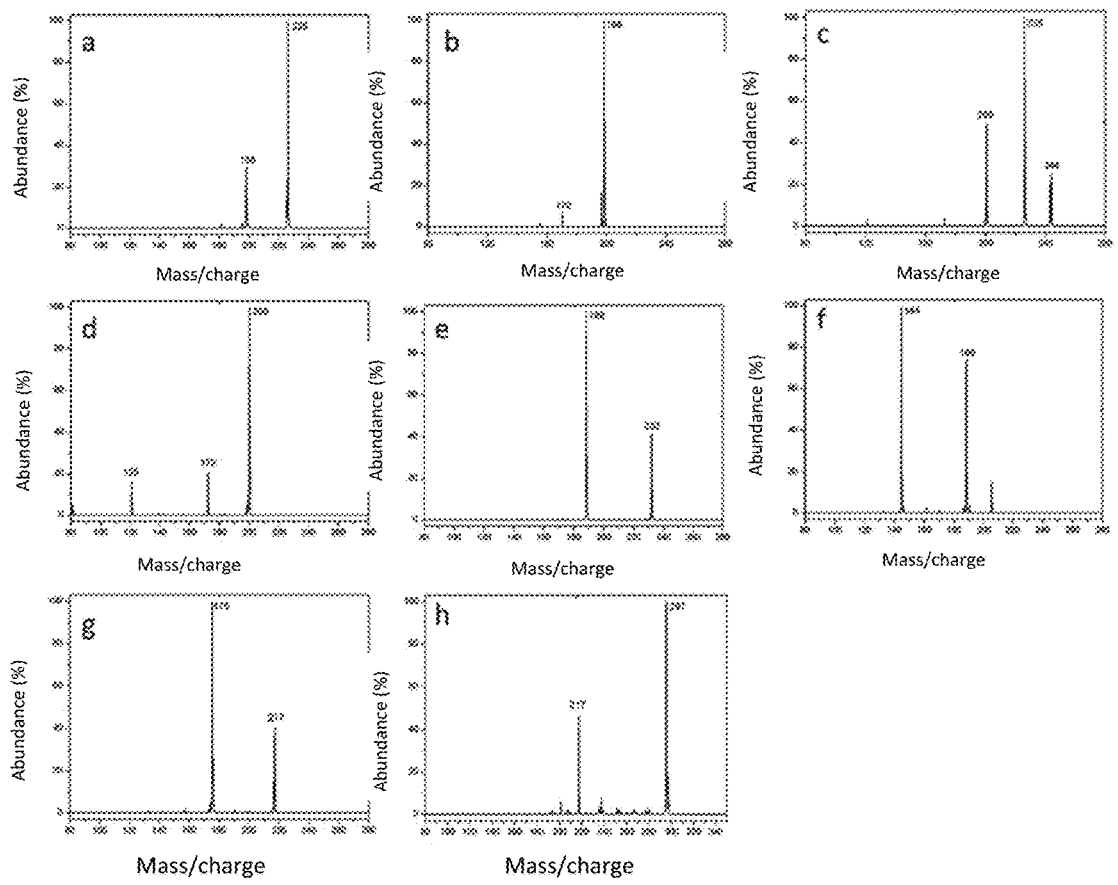

FIG. 14. Fragmentation mass spectra of degradation products of indigo carmine. a) Fragmentation of ion m/z 226d; b) Fragmentation of ion m/z 198, from ion m/z 226. c) Fragmentation of ion m/z 244; d) Fragmentation of ion m/z 200, from ion m/z 244. e) Fragmentation of ion m/z 232; f) Fragmentation of ion m/z 188, from ion m/z 232. g) Fragmentation of ion m/z 217; h) Fragmentation of ion m/z 297.

Figure 15:
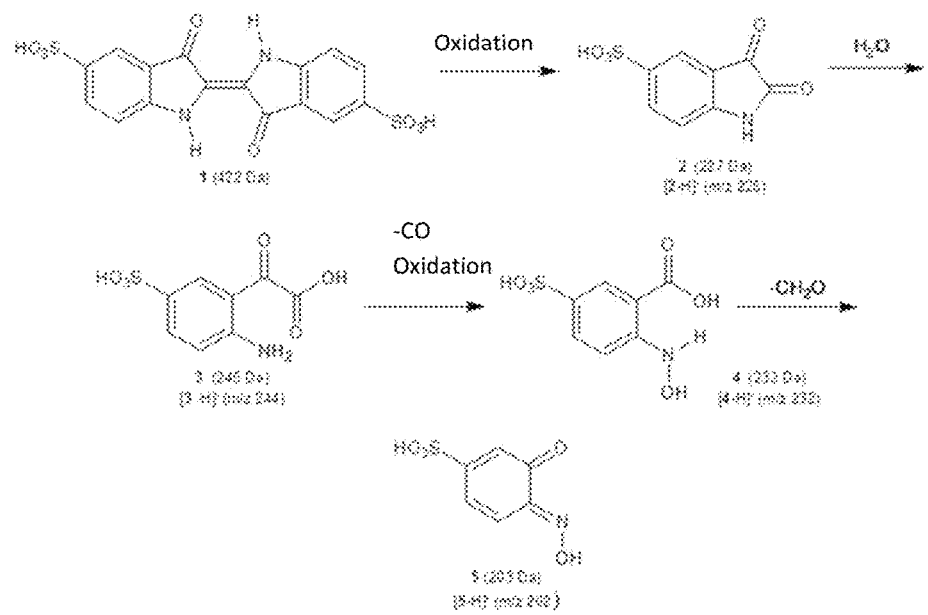

FIG. 15. Degradation route number 1 of indigo carmine.

Figure 16:
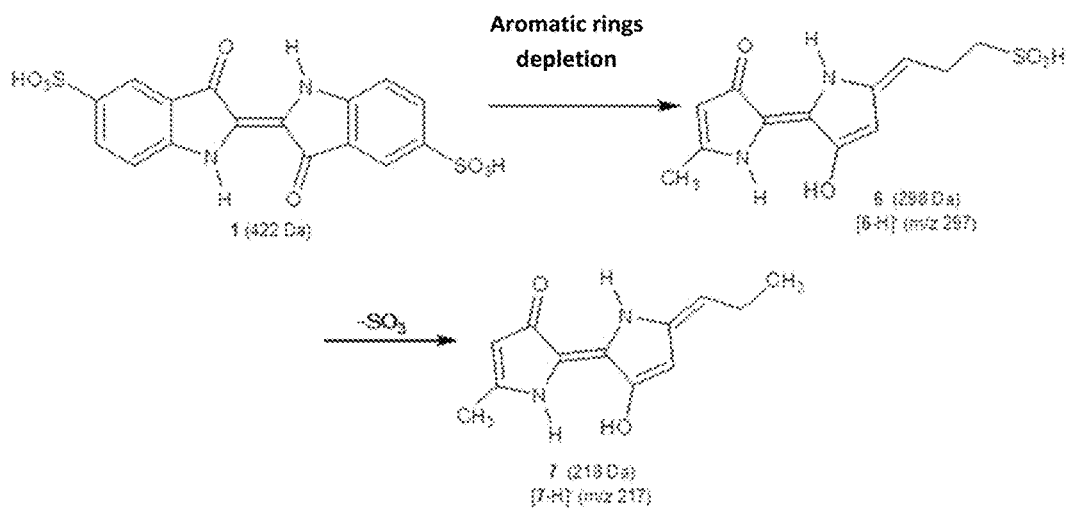

FIG. 16. Degradation route number 2 of indigo carmine.

5. DETAILED DESCRIPTION OF THE INVENTION

The invention consists of a material (which functions as a filter material) which is composed of hard fibers wherein there are deposited nanoparticles of metals or metal oxides by different techniques, useful in the degradation and removal of contaminants present in liquid matrices (for example, dyes such as methylene blue or indigo carmine, phenols or industrial wastewater). Such degradation and removal occurs by direct contact of the material and the contaminated matrix, and has a removal efficiency of 98% for 5 minutes contact.

Hard natural fibers are those fibers derived from monocotyledonous plants leaves, in which each fiber is associated with a vascular bundle fibers, having a high lignin content and being of hard texture. Within the hard natural fibers are henequen, sisal and fique. There are also synthetic fibers can be classified as "hard" for purposes herein, and essentially are those that can present structural, morphological and physicochemical features similar to the natural hard fibers. Examples of hard synthetic fibers include Dacron, Kevlar, among others.

Furthermore, the nanoparticles are clusters of atoms or molecules having a diameter less than 1000 nm. Nanoparticles have improved optical, electronic and catalytic properties than materials with microscopic dimensions (ASTM E 2456-06). Such materials can exist in liquid phase as colloids, as aerosols in gas phase and solid phase as discrete units immobilized on a holder (Navrotsky, A., et al. 2004) (Dong, H., et al. 2009). Nanoparticles have novel properties and applications due to the increased surface area:volume ratio, which occurs at nanometric level, which entails that there is a higher percentage of atoms or molecules composing the surface of nanoparticles. When a substance nanoparticles become part of another material such as a synthetic polymer, they affect its properties. For example, certain polymers can be reinforced by including metal nanoparticles, resulting in stronger materials, with the ability to replace some metals (Wang, L., et al. 2007). Specifically, the present invention consists of a material composed of:

a hard fiber based holder; and nanoparticles of metals or metal oxides

Preferably, the holder is based on hard natural fibers, such as henequen, sisal and fique. Likewise, preferably, the material of the present invention particularly contains period IV transition metal oxides, such as Fe, Zn, Co, Ni, Mn and Cu. For purposes of this application, the term "bionanocomposite" refers to material of the present invention. The innovation of this technology is to combine specifically the catalytic properties of the nanoparticles supported by the hard fibers. For instance, fibers bearing nanoparticles allow this new material function as a catalyst in heterogeneous phase. This means that the following aspects of the catalytic material are substantially improved: increased surface area, greater number of active sites that allow the conversion of the substrate; improving the material reuse due to its stability, fiber-nanoparticle interaction improves the stiffness of the material, because the nanoparticle binds strongly to the fiber, resulting in the possibility of yarn for the manufacture of filters; biodegradability, if the fibers are composed mainly of cellulose they are highly biodegradable.

The invention also concerns to the method for synthesizing the composite in situ by a on a hard fiber based holder and metal or metal oxides nanoparticles comprising the following steps:

a) Modifying the electrostatic environment of the hard fiber (e.g.: reversing the polarity of the surface by chemical treatment with HCl/NaOH);

b) Immersing the hard fiber in a solution of the metal or metal oxide precursor agent;

c) Depositing metal or metal oxide nanoparticles in the fiber by application of ultrasound; and d) Washing, drying and cleaning the resulting material.

In another embodiment, the method of synthesizing the material of the present invention comprises the following steps:

a) Immersing the hard fiber in a solution of the metal or metal oxide precursor agent;

b) Adding ethanol to the mixture with constant stirring;

c) Allowing to stand the final mixture;

d) Washing, drying and cleaning the resulting material.

Wherein the ethanol decreases the size of the particles of metal or metal oxide by chemical action and deposits them on the hard fiber.

Preferably, the holder is based on hard fibers, such as henequen, sisal and fique fibers. Likewise, preferably the metal oxides are oxides of period IV transition metal oxides such as Fe, Zn, Co, Ni, Mn and Cu.

FIG. 1 depicts the appearance of the fibers obtained after the synthesis processes described.

Example 1

Synthesis and Production In Situ of Nanoparticles of $Mn_3O_4$ on Fique Fibers

Steps followed to modify the electrostatic environment of fique fibers. The starting material was prepared by:

a) Immersing clean fique fibers in an aqueous solution of HCl, 6% on weight;

b) Transferring fique fibers to an aqueous solution of NaOH, 6% on weight;

c) Drying fibers at 60° C. for 15 hours.

Modified fique fibers were submerged in a precursor solution of $MnSO_4H_2O$ 5 mM. The solution was irradiated with Ultrasound (20 to 40 kHz, 130 W) during 25 minutes. Then fibers were transferred to an aqueous solution of $NH_4OH$ at 85° C. during 1 hour. Finally the resulting material was dried at 100° C. under an oxidizing atmosphere. Several precursor solutions were used, for example: 0.5, 1.0, 5.0, 30.0 and 100.0 mM. Likewise, the immersion times of fibers in precursor solution was also varied from 12.5 to 50 minutes. To achieve a concentration of $MnSO_4H_2O$ 5 mM the stoichiometric amounts of $NH_4OH$ were also varied. The precursor was varied too, using $MnCl_24H_2O$.

Example 2

Synthesis In Situ of $MnO_2$ Nanoparticles on the Surface of the Fique Fibers

Electrostatic environment modification of fique fibers was achieved by cationizing. To cationize their surface fique fibers were submerged in an aqueous solution of HCl 5% wt for 3 hours at room temperature. Then fibers were washed in abundant water, followed by immersion in a solution of NaOH 6% wt for 3 hours at 60° C. Finally fibers were dried at 80° C.

Nanoparticles synthesis was achieved by immersing the modified fibers in a solution of $KMnO_4$ 5 mM for 40 minutes. The fiber set of fique fibers-$KMnO_4$ solution was irradiated with ultrasound (between 20 to 40 kHz, 130 W), during immersion time. Finally, fibers were removed from solution and dried at 60° C. overnight. The concentration of precursor solution was varied, 2, 5, 10, 30 and 100 mM concentrations were tested.

Example 3

Synthesis In Situ of $MnO_2$ Nanoparticles on the Surface of the Fique Fibers

This method is a variation of the synthesis method from Example 2. This method consisted to immersing the fique fibers in a precursor solution of $KMnO_4$ during 30 minutes; followed by the addition of 20 mL of ethanol (Analytical grade) under constant stirring; reaction mixture is allowed to reach equilibrium during 2 hours. Finally the modifies fiber were dried at 60° C.

Example 4

Usage of the Example 2 Material to Degrading Indigo Carmine in Water

The material has an oxidizing ability for bleaching stock solutions of indigo carmine. For this dye, the pH of the solution is critical for degradation percentage achieved on assays. The solution acidification at a 2.5 pH allows a dye degradation greater than 97% in 5 minutes.

It is important to take into account that $MnO_2$ nanoparticles have a net negative charge at high pH values (see Sriskandakumar, T., et al. 2009). The indigo carmine solution acidification leads to the invertion of the material of the instant application surface polarity when immersed in the solution. Positive polarity of $MnO_2$ at bleaching experiments allows the interaction between indigo carmine (molecule with a net negative charge) and $MnO_2$, leading to a degradation reaction. It is important to consider that catalytic process is carried out by a surface mechanism, which only is possible to be achieved if the molecule that is intended to be degraded is contacted with the catalyst particles (see Al-Nakib. C., et al. 2009). FIG. 10 shows the visual and spectroscopic progress of the degradation process of dye.

FIG. 11 shows that increasing the precursor concentration decreases the removed dye percentage. This is debt to the fact that improving the size of material particles reduces their activity on dye degradation reactions. (Zhang. Z., et al. 1998)

TABLE 1

Size nanoparticle and $MnO_2$ concentration effects on the capability of the synthetized material for bleaching indigo carmine solutions.
Biocomposite material synthesized with ultrasound *

| Precursor concentration (mM) | Color remotion (%) |
|---|---|
| 0 | 30.30 |
| 2 | 98.80 |
| 5 | 98.25 |
| 10 | 98.10 |
| 30 | 96.85 |

* Cationized (treated with NaOH) fique fibers were used for this experiment.

Mass Spectrometry (MS) Identification of Degradation Byproducts

MS was used to study the indigo carmine degradation products. FIG. 12 shows MS spectrum of indigo carmine after 5 minutes that the degradation reaction occurs. Indigo carmine molecular anion is shown in the MS spectrum at (m/z 421) only in the original solution (FIG. 12*a*), it is not detected in the degradation products spectrum. FIG. 12*b* spectrum shows the anions detection with m/z 202, 217, 226, 232, 244, 297, 390 y 405, demonstrating the degration products formation.

FIG. 13 shows ion m/z 244 degradation. Fragment ions m/z 226 ($H_2O$ loss) and m/z 200 ($CO_2$ loss) were produced; Additionally, fragmentation of ion m/z 200, produces ions m/z 172 (CO loss) y m/z 120 ($SO_3$ loss). With those fragmentation processes is possible to establish the chemical identity of parent ions. Table 2 shows a summary of fragment ions and main degradation products. Furthermore, FIG. 14 shows the mass spectra of the fragmentation route of main degradation products.

FIGS. 15 and 16 show indigo carmine degradation pathways elucidated by MS analysis.

TABLE 2

Fragmentation ions of main degradation products [20].

| Ion precursor (m/z) | Fragmentation ions (m/z) | |
|---|---|---|
| [2-H]— (226) | [2-H—CO]— | (198) |
| [3-H]— (244) | [3-H—H2O]— | (226) |
| | [3-H—CO2]— | (200) |
| | [3-H—CO2—CO]— | (172) |
| | [3-H—CO2—SO3]— | (120) |
| [4-H]— (232) | [4-H—CO2]— | (188) |
| | [4-H—CO2—CH2NO]— | (144) |
| [6-H]— (297) | [6-H—SO3]— | (217) |
| [7-H]— (217) | [7-H—C3H6]— | (175) |
| [8-H]-(390) | [8-Mn2+—2AcO—]— | (217) |
| [9-H]— (405) | [9-Mn2+—2AcO—]— | (232) |

Fique Fibers and Metallic Oxide ($MnO_2$) Nanoparticles Synthesized Material Characterization a) Metal Oxide Identification on the Fique Fibers Surface.

Methodology by infrared spectroscopy, photo-acoustic spectroscopy and conventional solid infrared spectroscopy: the infrared spectroscopy of the solid that can be recovered from solution after the synthesis process, allows the identification of manganese oxide deposited on the surface of the fique fibers. To validate this identification, it is necessary to check that fique fiber cellulose was not chemically altered during the synthesis reactions. For this purpose, the infrared analysis bionanocomposites and fique fibers is performed by means of infrared photo-acoustic spectroscopy.

FIG. 2 shows infrared spectra of raw fique fibers, fique fibers whose electrostatic environment was modified (cationized fique fibers) and of $MnO_2$ bionanocomposites synthesized by a sonochemical method. The band located at 1430 $cm^{-1}$ (FIG. 3*a*) can be assigned to the bending vibration of cellulose —$CH_2$—; band localized in 900→$cm^{-1}$ can be assigned to the motion of C—O—C stretching own of the glycosidic linkage β-(1 4). These two bands are characteristic of crystalline cellulose II (Kuo, C H, et al. 2009) According to the analysis of the spectra it is concluded that the cellulose fique fibers are not involved in reactions of sonochemical synthesis of $MnO_2$.

FIG. 3 shows the infrared spectrum of the solid recovered from the final reaction solution in sonochemical synthesis. The spectrum shows bands at 520, 474 and 419 $cm^{-1}$, typical of $MnO_2$. This leads to the conclusion that the substance immobilized on the surface of fique fibers is $MnO_2$. (Liang, S., et al. 2008).

b) Study of the Interaction between Nanostructured Manganese Oxides and Fique Fibers Surface by X-ray Photoelectron Spectroscopy (XPS).

This type of analysis confirmed the identity of the nanoparticles synthesized on fique fibers. Additionally, the XPS spectra led to the conclusion that $MnO_2$ nanoparticles are stabilized by the glucose units that make up the cellulose of fique fibers, as explained below.

$MnO_2$ Bionanocomposites (Synthesis Ultrasound):

The interaction of manganese oxides with the surface of fique fibers was investigated by XPS. The spectrum of FIG. 4, taken to $MnO_2$ bionanocomposites obtained via ultrasound synthesis presents bands of $2p_{1/2}$ (659.1 eV) and $2p_{3/2}$ (647.3 eV) of manganese electronic states. The distance between these bands is 8.11 eV, which is typical of Mn (IV) present in the $MnO_2$ (Moulder, J F, et al. 1995).

According electronic binding energies reported in the literature, $2p_{1/2}$ and $2p_{3/2}$ Mn bands have a shift of 5.3 eV toward high energy bond. As a general rule, it has been established that shifts to higher bond energies correspond to an increase in the oxidation state (Shihabudheen, M., et al. 2010).

For materials deposited on holders, either inorganic or polymeric material of synthetic origin, a shift towards higher link energies does not necessarily imply an increase in the oxidation state of the manganese. In this case, shift indicates that there are oxygen atoms that coordinate with the manganese, and which are not related to the oxidation state (Radhakrishnan, R., et al. 2001). These coordinating oxygen atoms come from the cellulose surface of fique fibers.

It has been reported that the shift of the binding energy of nanoparticles deposited in arrays to higher energies is an indication of a strong interaction between the holder and the nanoparticles, resulting in the stabilization of its junction (Bock, C., et al. 2009). Thus it can be stated that the holder influences the chemical shift of the bands of manganese, as a result of the nanoparticles stabilization.

Stabilization model of $MnO_2$ nanoparticles on cellulose holder, elucidated from stabilization models reported in media containing high density of oxygen atoms is shown as follows:

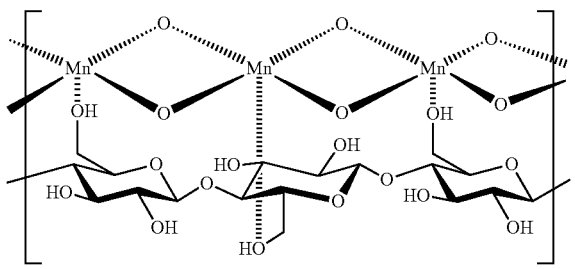

$MnO_2$ nanostructure stabilization model on celluose holder.

In Table 3, the binding energies of the $2p_{3/2}$ band of immobilized $MnO_2$ on different holders and shift regarding the $2p_{3/2}$ band of free particulate $MnO_2$ are recorded. It can be observed that the shift is minimal (less than 0.2) for holder that do not have oxygen or strongly electronegative groups. Additionally in Table 1, it is appreciated that different shifts were carried out when manganese was immobilized on a type of cellulose fibers from India and cellulose from fique fibers.

TABLE 3

Energies of the $MnO_2$ $2p_{1/2}$ electronic state due to different holders.

| Material | Bonding energy $2p_{3/2}$ (eV) | Energy shift to higher energies (eV) |
|---|---|---|
| $MnO_2$ nanoparticles (see Nesbitt, H. W., et al. 1998) | 642.0 | — |
| $MnO_2$ nanoparticles supported in gold nanoparticles (see Wang, L., et al. 2008) | 642.1 | 0.1 |
| $MnO_2$ nanoparticles supported in carbon nanotubes (see Gong, G., et al. 2007) | 642.2 | 0.2 |
| $MnO_2$ nanoparticles supported in silica (SiO2) (see J. F. Moulder, et al. 1995) | 644.0 | 2.0 |
| $MnO_2$ nanoparticles supported in cellulose (see Lenzis AG, India, Shihabudheen, M., et al. 2010) | 642.7 | 0.7 |
| $MnO_2$ nanoparticles supported on fique fivers (this invention) | 647.3 | 5.3 |

Thus, the results of spectroscopy XPS shown in FIG. 4 confirm the identity of nanostructured $MnO_2$ immobilized on fique fibers. Additionally, these results demonstrate that the binding between synthesized nanoparticles and fique fibers is stabilized.

c) Study the Surface Morphology of Fibers of Sisal: Microscopic Analysis of the Synthesized Bionanocompounds.

Microscopic analysis of fique fibers reveals that its surface morphology is highly heterogeneous. The fibers are composed of helical microfiber, channels of microscopic diameters (4-7 μm), micropores and cavities (FIG. 5) that provide sites where the $MnO_2$-nanostructures synthesis take place.

Bionanocomposites microscopy images comprising fique fibers and $MnO_2$ show that it is possible to synthesize manganese oxide nanostructures on the surface of said fibers. FESEM images reveal that it was possible to obtain spherical discrete nanoparticles (FIG. 6a) between 115-235 nm in diameter, which occurred when a low precursor concentration (5 mM) was used in the synthesis. In FIG. 6b, it is seen that the use of high concentrations of $KMnO_4$ (50 mM) caused aggregation of nanostructures, with nanoparticles and nanorods growing up to having diameters between 55-320 nm.

In FIG. 7B, the FESEM image of the obtained nanoparticles by sonochemical synthesis (precursor concentration of 2 mM) is shown; the size of the synthesized nanoparticles in the surface of $MnO_2$ agglomerations ranges from 20 to 30 nm. In FIG. 7D, bionanocomposites FESEM images of $MnO_2$ obtained by ethanolic synthesis (precursor concentration 2 mM); the size of the synthesized nanoparticles ranges from 40-80 nm is possible to appreciate that the size distribution and mean size of the material obtained by synthesis with ultrasound is less than those obtained by ethanol synthesis Thus bionanocomposites synthesized with ultrasound exhibit greater surface area and thus greater activity at degrading indigo type dyes in water.

FIG. 8 shows $MnO_2$ bionanocomposites FESEM images, wherein it is possible to appreciate the presence of $MnO_2$ nanostructures between channels and microfibers own of fique fibers. It is important to note that deposition of $MnO_2$ nanoparticles in some places of fique fibers, induces an improvement in the mechanical properties, such as an increased tensile strength.

d) Characterization of the Synthesized Material by UV-Vis Spectroscopy.

FIG. 9 shows the UV-VIS diffuse reflectance spectra of the synthesized material taken using as reference sample raw fique fibers. Reflectance minimum, having lengths shift to longer wavelengths as the concentration of the precursor is increased is observed. This indicates that the increased $KMnO_4$ concentration in synthesis, leads to an increase in the size of the synthesized nanostructures (Link, S., et al. 1999).

REFERENCES

Al-Nakib C., Azam, M S., Aktaruzzaman M., Rahim A. "Oxidative and antibacterial activity of $Mn_3O_4$." Journal of Hazardous Materials, Vol. 172, p. 1229-1235. 2009.

Sen, S., Demirer, G. N. "Anaerobic Treatment of Real Textile Wastewater with a Fluidized Bed Reactor." Water Res. 2008, Vol. 37, p. 1868-1878. 2003.

Bhatnagar, A., Jain, A. K., Mukul, M. K. "Removal of Congo red dye from water using carbon slurry waste." Environmental Chemistry Letters, Vol. 2, p. 199-202. 2005.

Muruganandham, M., Swaminathan, M. "Photochemical oxidation of reactive azo dye with UV-$H_2O_2$ process." Dyes and Pigments, Vol. 62, p. 269-275. 2004.

Arslan, I., Balcio, A., Bahnemann, D. W. "Advanced chemical oxidation of reactive dyes in simulated dyehouse effluents by ferrioxalate-Fenton/UV-A and $TiO_2$/UV-A processes." Dyes and Pigments, Vol. 47, p. 207-218. 2000.

Yang, C., McGarrahan, J. "Electrochemical coagulation for textile effluent decolorization." Journal of Hazardous Materials. Vol. 127, p. 40-47. 2005.

Robinson, T., McMullan, G., Marchant, R., Nigam, P. "Remediation of dyes in textile effluent: a critical review on current treatment technologies with a proposed alternative." Bioresource Technology, Vol. 77, p. 247-255. 2001.

An, H., Qian, Y., Gu, X., Tang, W. "Biological treatment of dye wastewaters using an anaerobic-oxic system." Chemosphere, Vol. 33, p. 2533-2542. 1996.

Burtscher, E., Hung, Y., Bechtold, T., "Handbook of Industrial and Hazardous Wastes Treatment." Edited by Lawrence, K., Wang, Hung, Y., Howard, H., Yapijakis, C., CRC, p. 379-399. 2004.

Stobbe, E., De Boer, B. A., Geus, J. W. "The reduction and oxidation behavior of manganese oxides." Catalysis Today, Vol. 47, p. 161-167. 1999.

Zhu, S., Zhou, Z., Zhang, D., Wang, H. "Synthesis of mesoporous amorphous $MnO_2$ from SBA-15 via surface modification and ultrasonic waves." Microporous and Mesoporous Materials, Vol. 95, p. 257-264. 2006.

Wang, H., Zheng, M., Chen, J., Ji, G., Cao, J. "Synthesis of $MnO_2$ Microfiber with Secondary Nanostructure by Cotton Template." Journal of Nanotechnology. 2010.

Cao, G., Su, L., Zhang, X., Li, H. "Hydrothermal synthesis and catalytic properties of α- and β-$MnO_2$ nanorods." Materials Research Bulletin, Vol. 45, p. 425-428. 2010.

"ASTM E 2456-06 Standard Terminology Relating to Nanotechnology." Disponible en: http://www.astm.org/Standards/E2456.htm Navrotsky, A. "Environmental Nanoparticles: Encyclopedia of nanoscience and nanotechnology" University of California, Davis. Edited by James A. Schwarz and Cristian I. Contescu. p. 5-125. 2004.

Dong, H., Hinestroza, J. "Metal Nanoparticles on Natural Cellulose Fibers: Electrostatic Assembly and In Situ Synthesis." ACS, Applied materials and interfaces. Vol. 1, p. 797-803. 2009.

Wang, L., Zhao, W., O'Donoghue, M., Tan, W. "Fluorescent Nanoparticles for Multiplexed Bacteria Monitoring." Bioconjugate Chem., Vol. 18(2), p. 297-301. 2007.

Sriskandakumar, T., Opembe, N., Chen, C., Morey, A., King'ondu, C., Suib, S. L. "Green Decomposition of Organic Dyes Using Octahedral Molecular Sieve Manganese Oxide Catalysts." Journal of Physical Chemistry. A. Vol. 113, p. 1523-1530. 2009.

Zhang, Z., Wang, C., Zakaria, R., Ying, J. Y. "Role of Particle Size in Nanocrystalline $TiO_2$-Based Photocatalysts." Journal of Physical Chemistry. B. Vol. 102, p. 10871-10878. 1998.

Kuo, C. H., Lee, C. K. "Enhancement of enzymatic saccharification of cellulose by cellulose dissolution pretreatments." Carbohydrate. Polymers, Vol. 77, p. 41-46. 2009.

Liang, S., Teng, F., Bulgan, G., Zong, R., Zhu, Y. "Effect of phase structure of $MnO_2$ nanorod catalyst on the activity for CO oxidation." Journal of Physical Chemistry. C. Vol. 112, p. 5307-5315. 2008.

Moulder, J. F., Stickle, W. F., Sobol, P. E., Bomben, K. D., Chastain, J., King Jr R. C. "Handbook of X-ray Photoelectron Spectroscopy" Physical Electronics. Lake Drive East, Chanhassen, Minn., USA. 1995.

Shihabudheen, M., Kinattukara, L., Pradeep, T. "A novel cellulose-manganese oxide hybrid material by in situ soft chemical synthesis and its application for the removal of Pb(II) from water." Journal of Hazardous Materials. Vol. 181 p. 986-995. 2010.

Radhakrishnan, R., Oyama, S. T. "Electron Transfer Effects in Ozone Decomposition on Supported Manganese Oxide." The Journal of Physical Chemistry. B. Vol. 105 B, p. 4245-4253. 2001.

Bock, C., MacDougall, B., Chang, S., Botton, G., Kingston, D., Halvorsen, H. "Stabilization of Pt nano-particles on modified HOPG." Brockhouse Institute for Materials Research, McMaster University, Hamilton, Ontario, Canada. 2009. Disponible en: www.electrochem.org/meetings/scheduler/abstracts/216/2880.pdf Nesbitt, H. W., Banerjee, D. "Interpretation of XPS Mn(2p) spectra of Mn oxyhydroxides and constraints on the mechanism of $MnO_2$ precipitation". American Mineralogist, Vol. 83, p. 305-315. 1998.

Wang, L., Liu, Y., Chen, M., Cao, Y., He, H., Fan, K. "$MnO_2$ Nanorod Supported Gold Nanoparticles with Enhanced Activity for Solvent-free Aerobic Alcohol Oxidation." Journal of Physical Chemistry. C. Vol. 112, p. 6981-6987. 2008.

Gong, G., Yu, P., Su, L., Xiong, S., Mao. L. "Polymer-Assisted Synthesis of Manganese Dioxide/Carbon Nanotube Nanocomposite with Excellent Electrocatalytic Activity toward Reduction of Oxygen." Journal of Physical Chemistry. C. Vol. 111, p. 1882-1887. 2007.

Link, S., El-Sayed, M. A. "Size and Temperature Dependence of the Plasmon Absorption of Colloidal Gold Nanoparticles." Journal of Physical Chemistry. B. Vol. 103, p. 4212-4217. 1999.

F. Polzer, S. Wunder, Y. Lu, M. Bal-lauff. "Oxidation of an organic dye catalyzed by MnOx nanoparticles." Journal of Catalysis. 2012, 289, 80-87.

S. Chandra, P. Dasa, S. Bag, R. Bhar, P. Pramanika. "Mn2O3 decorated graphene nanosheet: An advanced material for the photocatalytic degradation of organic dyes." Materials Science Engineering B-Solid. 2012, 177 (11), 855-861.

M. F. Contreras, W. A. Hormaza. "Fractografía de la fibra natural extraída del fique y de un material compuesto reforzado con tejido de fibra de fique y matriz resina poliéster." Revista Latino Americana de Metalurgia y Materiales. 2009, 1, 57-67.

P. Gañan, I. Mondragón. "Surface modification of fique fibers. Effect on their physicomechanical properties." Polymer Composite 2002, 23 (3), 383-394.

The invention claimed is:

1. A bionanocomposite, comprising:
    a) a natural hard fiber selected from the group consisting of henequen, sisal and fique; and
    b) metal oxide nanoparticles deposited on said natural hard fiber, wherein the metal is selected from the group consisting of Mn and Fe, having a size distribution ranging from 20 to 30 or 40 to 80 nm.

2. The bionanocomposite material of claim 1, wherein the natural hard fiber is fique.

3. The bionanocomposite material of claim 1, wherein the metal is Mn.

4. The material of claim 1, wherein the metal oxide is selected from the group consisting of $MnO_2$, $Mn_3O_4$, $Fe_2O_3$ and $Fe_3O_4$.

5. The bionanocomposite of claim 1, wherein the metal is Fe.

6. A method of using the bionanocomposite of claim 1, comprising contacting the bionanocomposite with a material selected from the group consisting of indigo carmine and sulfur black and catalytically oxidatively degrading the material.

7. The method of claim 6, wherein the indigo carmine or sulfur black is contained in residual water from a process of dyeing denim.

8. A process to synthesize a bionanocomposite material, comprising the following steps:

a) modifying the electrostatic environment of a natural hard fiber selected from the group consisting of henequen, sisal, and fique;
b) immersing the natural hard fiber in a solution that contains a metal oxide precursor, wherein the metal is selected from the group consisting of Mn and Fe; and
c) depositing metal oxide nanoparticles on the natural hard fiber; wherein the metal oxide depositing is achieved using a method selected from ultrasound radiation for a period of time and supplying an ethanol solution, with said metal oxide nanoparticles having a size distribution ranging from 20 to 30 or 40 to 80 nm.

9. The process of claim 8, wherein ultrasound radiation is used and the ultrasound radiation has a frequency between 20 and 40 kHz.

10. The process of claim 8, wherein ultrasound radiation is used and the time of ultrasound irradiation is between 20 and 50 minutes.

11. The process of claim 8, wherein the ethanol solution has a concentration of industrial grade.

12. The process of claim 8, wherein the natural hard fiber is fique.

13. The process of claim 8, wherein the metal is Mn.

14. The process of claim 8, wherein the metal oxide is selected from $MnO_2$, $Mn_3O_4$, $Fe_2O_3$ and $Fe_3O_4$.

15. The process of claim 8, wherein the metal is Fe.

16. A method of using the bionanocomposite made by the process of claim 8, comprising contacting the bionanocomposite with a material selected from the group consisting of indigo carmine and sulfur black and catalytically oxidatively degrading the material.

17. The method of claim 16, wherein the indigo carmine or sulfur black is contained in residual water from a process of dyeing denim.

* * * * *